United States Patent [19]
Poggiagliolmi

[11] Patent Number: 6,084,825
[45] Date of Patent: Jul. 4, 2000

[54] APPARATUS AND METHODS FOR SEISMIC DATA PROCESSING

[75] Inventor: Elio Poggiagliolmi, London, United Kingdom

[73] Assignee: Western Atlas International, Inc., Houston, Tex.

[21] Appl. No.: 08/866,623

[22] Filed: May 30, 1997

[30] Foreign Application Priority Data

May 31, 1996 [GB] United Kingdom .................... 9611413

[51] Int. Cl.[7] ..................................................... G01V 1/00
[52] U.S. Cl. ............................................... 367/30; 367/70
[58] Field of Search .................................. 367/30, 70, 75

[56] References Cited

U.S. PATENT DOCUMENTS 5,793,554 8/1998 Chainer et al. .......................... 367/75

Primary Examiner—John Barlow
Assistant Examiner—Anthony Jolly

[57] ABSTRACT

A method of determining an optimum processing sequence by calculation of processing sequence sensitivity and processing sequence error. A reference seismic processing sequence is applied to input raw gathers to obtain reference seismic output data. A series of test seismic processing sequences are applied to the input raw gathers to obtain test seismic output data. The RMS value of the test seismic output data is normalized to that of the reference seismic output data on a trace by trace basis. The normalized difference between the test and the reference seismic output data is calculated on a sample by sample basis in the time domain and are displayed on color coded plots in the time scale format over the CDP range. Linear regression is performed for each CMP gather to obtain the stack and the zero offset calculated for each time index and the difference is recorded. The normalized differences between the error for the test and the reference sequences are calculated and displayed on color coded plots. The order of sensitivity for each processing step in the reference processing sequence is determined. If necessary, any processing step is rejected and the reference processing sequence is revised.

3 Claims, 6 Drawing Sheets

(4 of 6 Drawing Sheet(s) Filed in Color)

APPARATUS AND METHODS FOR SEISMIC DATA PROCESSING

BACKGROUND OF THE INVENTION

1. Field of the Invention

The invention relates to apparatus and methods for seismic data processing and is applicable particularly to objectively evaluating the effectiveness of the application of one or more selected processing sequences in the interpretation of seismic and other geophysical data. Concomitantly, this invention allows for the optimal selection of parameters for use in the associated processes.

2. Description of the Related Art

In the area of the seismic method applied to hydrocarbon reservoir exploration and development, a source at or near the surface of the earth radiates an acoustic wavefield. Propagating through the earth, the wavefield encounters subsurface earth strata whose layer boundaries offer acoustic impedance contrasts. The wavefield is reflected therefrom back to the surface where the reflected wavefield is detected by an array of seismic sensors. The sensors or receivers provide electrical signals that are representative of the mechanical disturbances due to the propagating seismic wavefield. Sensors in common use include geophones that measure particle velocity, hydrophones that measure pressure of compressional waves or accelerometers that measure accelerating forces.

During the conduct of a seismic survey, an acoustic source is positioned relative to an array of spaced-apart receivers but separated therefrom by a preselected gap or offset such as 25 or 50 meters or a multiple thereof. The receivers within the array may include hundreds or even thousands of units that may be distributed over many kilometres along a line or over a region to be surveyed. Following each wavefield-radiation episode, the source and receiver are repositioned at new survey observation stations.

Seismic signals as detected by the respective receivers are transmitted to a central station over suitable communication channels which may be electrical, optical, acoustic or ethereal. The signals from each of the individual receivers or receiver groups are stored in a multi-channel data-recording unit for archival storage. The stored data are delivered to a data-processing center where the data accumulated during a survey are quantized and processed, preferably by computer because of the huge volume of seismic data that may total many terabytes.

The elapsed two-way reflected travel times of the wavefield radiated from the source to the respective subsurface strata and back to the receivers at the surface are a measure of the depths of those strata provided the acoustic propagation velocity characteristic of the intervening rock layers is known. Thus, a detailed 2-dimensional (2-D) image of the topography of the subsurface beneath a single line of survey can be determined from seismic reflection times. Use of multiple lines of survey provide areal 3-D coverage.

The results of a seismic survey may be displayed as a cross section of the earth in the time-space domain as a series of time scale traces, one trace per receiver channel ordered according to geographic position along a line or region of survey. Prominent reflected events can be followed along the cross section, indicating the structural attitude of the underlying bedding planes. Various combinations of source-receiver configurations may be used to enhance the quality of a display such as common receiver gathers, common source gathers, common offset gathers or common depth point gathers, all of which are well known.

A seismic wavelet begins to propagate at the instant of energy release from the source. If the wavelet were indeed able to retain its identity as a sharp pulse throughout its entire propagation path the time, indicated by the onset of a reflected pulse as recorded at a receiver, could be measured exactly. But during propagation through the earth, due to earth filtering and other causes, the pulse rapidly degenerates into a complex wavelet, often with a number of side lobes. Random noise contaminates the wavelet. Complex subsurface geology further complicates the reflected waveform such that the true onset of the reflected wavefield is obscured.

Seismic data as received are complicated by the cumulative effects of the impulse response of the source, the earth, the receivers and the ancillary electronics. Because of that complexity, a simple display of raw seismic traces is difficult and often impossible to interpret. For that reason, the data must be processed by use of exotic methods requiring massive, expensive computing resources.

Because of the sometimes great expense involved, preparatory to a full-blown processing campaign, one must decide on the cost-effectiveness of one or more of a series of proposed data processing steps to be used in determining a usable subsurface image of the geological structures. Having chosen a preferred process, one must determine the optimal parameter values to be used in the selected processing step.

Heretofore it has been customary to compare, by inspection, the results displayed on a seismic cross section before and after a particular processing step has been applied to the data. In addition, having selected a processing step, the interpreter must incrementally perturb the parameters in order to decide the optimal values of the associated parameters. That method of quasi-visual quality-evaluation is not only highly subjective but is decidedly uneconomical in the face of massive volumes of data.

There is a need for a method that quantifies the effectiveness of a chosen processing step or sequence of processing steps to achieve a set of seismic traces in which each trace is a close representation of the subsurface vertical acoustic response below the geographical location. In addition, there is also a need to obtain the optimum selection of seismic processing parameters applicable to the selected processing steps.

SUMMARY OF THE INVENTION

According to one aspect of the invention we are concerned with Seismic Processing Parameters Determination. In one example this is a method of or apparatus for assessing the relative sensitivity of the processing steps selected for a processing sequence; and of optimizing the processing parameters for each processing step. The method may comprise two modules, namely a seismic sensitivity test (SST) and an integrated parameter determination (IPD). The SST module determines both the sensitivity and error level contributed by each processing step embedded in a processing sequence. The sensitivity may be referred to as the processing sequence sensitivity (PSS) and the error may be referred to as the processing sequence error (PSE). The IPD module performs the parameter optimization based on multi-well wavelet analysis. Examples will now be considered.

Seismic Sensitivity Test (SST)

The input data to the SST module is a selection of raw/pre-processed seismic data/traces in the form of raw gathers over a CDP range. Over a specified time window, the input data is processed repetitively depending on the number of processing steps in the sequence. Each time, one processing step is either modified or omitted from the full/reference sequence, which is referred to as a test sequence. The outputs from the test sequences are normalized to the same RMS level as that from the reference sequence. The sensitivity (PSS) for each processing step is defined by the normalized difference between the test and the reference sequence and is calculated on a sample by sample basis in the time domain. The normalization factor is equal to the larger of the two sample data for the test and the reference at a particular time index. In such a way, the sensitivity value is limited within the range +/−1. The sensitivity data is then displayed on color plots over the specified time and CDP range for assessment.

The relative error (PSE) level in the data, resulting from the inclusion of a given process in the sequence, is also calculated by SST. This is a measure of noise (e.g. multiples, random noise, NMO stretch, etc.) interfering with the stack response of the primary reflections and is carried out on the CMP gathers. From the calculated error, it is possible to determine whether the given process should be kept or eliminated from the sequence, irrespective of its sensitivity.

For each CMP gather, a linear regression is performed to obtain the mean/stack value and the zero offset value (regression intercept) for each time index. The absolute value of the differences between these two values is then recorded. The error (PSE) for each processing step is equal to the normalized difference of the absolute differences between the test and the reference sequence and is calculated on a sample by sample basis in the time domain. The normalization factor is equal to the larger of the two sample data for the test and the reference at a particular time index. In such a way, the error value is limited within the range +/−1. The error data is then displayed on color plots over the specified time and CDP range for assessment.

Integrated Parameter Determination (IPD)

The optimum processing sequence may optionally be determined from the order of sensitivity for each of the processing steps. Once the optimum processing sequence is determined, the IPD can be carried out to quantitatively and objectively evaluate the results obtained from the integration of borehole and seismic data given a set of parameters for each processing step. Migrated stack panels of seismic traces around a well location are generated for many combinations and permutations of the seismic processing parameters to be tested. Attribute values are calculated from the wavelets extracted from each trace in each stack panel using well acoustic data and are displayed as a color matrix called SCAN. These attribute values define both the best correlation between the well trace and the corresponding seismic trace, and the complexity of the extracted wavelet.

One of the attributes displayed by the SCANs is called GF. This is a measure of the goodness of fit of the well trace to the seismic trace. The well trace is generated by convolving the well reflectivity with the extracted wavelet from each trace. GF can be calculated from the correlation coefficient of the cross-correlation between the well trace and the seismic trace.

The other measured attribute is called WF which is a measure of the complexity of the extracted wavelets. WF can be calculated from the ratio of the second moment of the reference wavelet to that of the extracted wavelet. The WF of an extracted wavelet, relative to a reference wavelet having the same bandwidth as the data, is a sensitive measure of the wavelet energy distribution away from the wavelet origin, and its value can vary between zero and one. The reference wavelet is normally derived from an amplitude frequency spectrum obtained from the sum of a large number of trace to trace cross correlations. The layout of each SCAN is designed to provide at a glance all the pertinent information required for the evaluation and selection of the relevant processing steps and parameters.

According to another example there is provided a method of determining an optimum processing sequence by calculation of processing sequence sensitivity and processing sequence error, comprising:

a. providing a reference processing sequence to be applied to the input raw gathers;

b. selecting a series of test processing sequences to be applied to the input raw gathers;

c. applying the reference processing sequence and the test processing sequence to the input raw gather to obtain the reference and the test seismic output data;

d. normalizing the RMS value of the test seismic output data to that of the reference seismic output data on a trace by trace basis;

e. finding the normalized difference between the test and the reference seismic output data on a sample by sample basis in the time domain;

f. displaying the differences on color coded plots in the time scale format over the CDP range;

g. for each CMP gather, performing linear regression to obtain the stack and the zero offset calculated for each time index;

h. recording the difference between these two values obtained in g;

i. finding the normalized differences between the error for the test and the reference;

j. displaying the results from i on color coded plots for assessment;

k. determining order of sensitivity for each processing step in the reference processing sequence; and l. if necessary, rejecting any processing step based on the results from f and j and revising the reference processing sequence.

According to a further example there is provided a method of optimizing the processing parameters for the processing steps in an optimized processing sequence by integration of acoustic borehole data with seismic data, the method comprising the following steps:

a. take input raw gather (and optionally determine and apply the optimal processing sequence from the preceding example to the input raw gather);

b. for each trace, measure the goodness of fit (GF) by calculating the correlation coefficient of the cross-correlation between the seismic trace and the well trace, the well trace being generated by convolving well reflectivity with the extracted wavelet;

c. for each wavelet, measure the wavelet complexity (WF) by calculating the ratio of the relative second moment of the reference wavelet to that of the extracted wavelet;

d. based on the results obtained from b and c, determine the optimum processing parameters for each processing step.

BRIEF DESCRIPTION OF THE DRAWINGS

The file of this patent contains at least one drawing excuted in color.

For a better understanding of the invention a show how the same may be carried into effect, reference will now be made, by way of example, to the accompanying drawings, in which.

DETAILED DESCRIPTION OF THE PREFERRED EMBODIMENTS

Successful processing of seismic data must meet two important objectives:

a. to provide a set of seismic traces in which each trace is a close representation of the subsurface vertical acoustic response below the trace geographical location;

b. to reliably correlate seismic traces at well locations with acoustic logs, so that seismic reflections can be directly correlated to the stratigraphy found in the well.

At present the choice of both processing sequence and seismic processing parameters relies on the skills and experience on the part of the processing analyst. Typically, processing parameters selection is performed by inspection and subjective judgement of seismic data processed through a variety of processing steps and parameters.

With the embodiment now to be described, it is possible to determine the optimum inclusion, or exclusion, of any number of processing steps in a processing sequence. This embodiment enables optimum selection of any number of processing parameters in any process, including spatial processes, e.g. f–k, RMA, migration, etc., and measures the sensitivity of the seismic data to any processing parameter. This embodiment can be performed on 2D and 3D seismic data in conjunction with vertical or deviated wells.

In addition, this embodiment proves to be a very effective tool for the quantification of seismic data quality control and to help in the design of seismic acquisition surveys.

The selection of the optimum processing sequence and the optimum processing parameters is performed in this embodiment by means of two modules, viz seismic sensitivity tests (SST) and integrated parameter determination (IPD).

The performance of each seismic processing step, and indeed that of the entire processing sequence, depends on the characteristics of the seismic data. This is because the many operators applied sequentially to the data, during a typical processing sequence, are derived from attributes of the seismic data themselves. For this reason it is paramount to determine the sensitivity of the seismic data to each processing step applied, relative to the entire processing sequence. With this knowledge, it is possible to optimize the processing parameters starting from the most sensitive process. In addition, insensitive processes can be excluded from the final sequence which, in turn, will make the data processing simpler and more cost effective.

The optimization of processing parameters in the processing sequence, in the order determined by SST, is performed by the IPD module. Parameter optimization is based on multi-well wavelet analysis.

SST—Seismic Sensitivity Test

Figure 1:
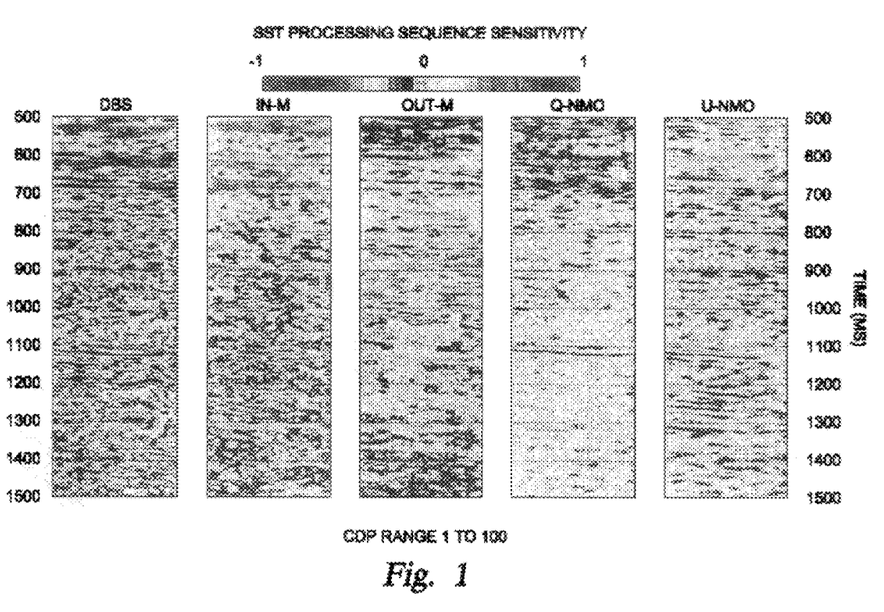
FIG. 1 is an example display of processing sequence sensitivity.

SST determines both the sensitivity and error level contributed by each processing step embedded in a processing sequence. The sensitivity of each step in the sequence is measured by making use of sensitivity theory. Any processing sequence can be viewed as a multi-channel multi-path network within which the process to be tested is embedded. Replacement and/or elimination (i.e. perturbation) of this process leaves the topology of the network invariant. This property is used to calculate the change in the magnitude of the output of the sequence with the perturbed process, relative to that of the unperturbed (or reference) sequence. The result of this calculation is defined as the relative sensitivity of the processing sequence, resulting from a predetermined perturbation of one of the processes embedded in the same sequence. An example of the relative sensitivity of several processes is illustrated in FIG. 1. Here the sensitivity of each of five processes, in the same processing sequence, is displayed versus two-way time (from 500 ms to 1500 ms) and CDP trace number (from CDP 1 to CDP 100). The five processes being tested are from left to right: deconvolution before stack (DBS), inner mute (IN-M), outer mute (OUT-M), over-NMO (normal moveout) corrections (O-NMO) (obtained with velocities higher than those used for the reference sequence) and under-NMO corrections (U-NMO). For ease of comparison the range of sensitivity values is normalized to 1 and −1 and keyed to a color scale. In this way, if a large perturbation, resulting from the elimination of a process, produces relative sensitivity values close to zero (green to light blue colors), the process is very insensitive.

Conversely values represented by red or bright purple colors indicate that the sensitivity of the process is very high. It is also important to know whether the application of a process is amplifying or attenuating the energy in the data. This information is supplied by the sign of the sensitivity values. For example the DBS panel shows that DBS has amplified the energy (values>0) from 500 ms to 700 ms, while the two events occurring approximately between 1140 and 1200 ms have been attenuated by DBS (values<0). By comparison, the inner mute panel shows similar color patterns as the DBS panel, which in turn means that this process increases the primary reflections energy and attenuates multiples but it is not as sensitive as DBS.

Continuing with the description of the panels in FIG. 1, the color distribution in the OUT-M panel is roughly opposite to that of the DBS and IN-M panels. This means that except in places where colors match with those in the panels to its left, the application of outer-mute is at best insensitive and at worst slightly attenuates primary energy. Finally, a comparison of over-NMO and under-NMO panels, shows almost opposite color patterns, indicating that U-NMO improves somewhat the primary to multiple ratio (i.e. it increases the primary energy), especially from approximately 500 ms to 700 ms, whereas the opposite occurs in O-NMO panel. From an overall inspection of FIG. 1, it is clear that the most sensitive process is DBS followed by IN-M, OUT-M, U-NMO and O-NMO.

The relative error level in the data, resulting from the inclusion of a given process in the sequence, is also calculated by SST. This is a measure of noise (e.g. multiples, random noise, NMO stretch, residual NMO, AVO etc.) interfering with the primary stack response of the primary reflections, and is carried out on the CMP gathers. From the calculated error, it is possible to determine whether the given process should be kept or eliminated from the sequence, irrespective of its sensitivity.

Figure 2:
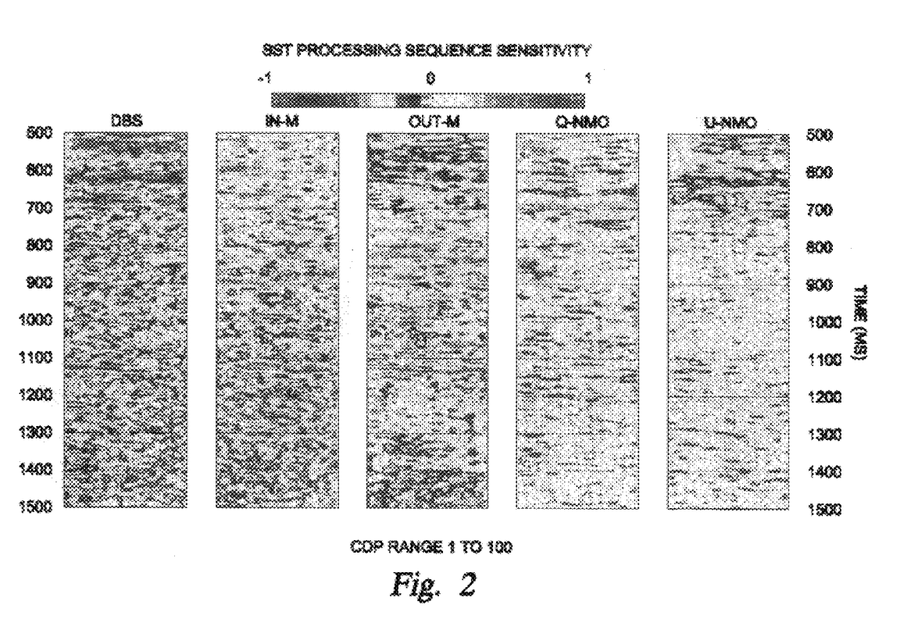
FIG. 2 is an example display of the processing step error.

FIG. 2 is a display of the relative error resulting from the inclusion of the same processes in the processing sequence, as for the seismic sensitivity explained above. Like the sensitivity display example shown in the FIG. 1, the relative error values are normalized to 1 and −1, depending on their original sign and keyed to the same color key as that used in FIG. 1.

A cursory comparison of FIGS. 1 and 2, reveals that the color patterns of the two displays are similar. This means that an increase in the relative error is associated to an increase in energy amplification and vice versa. The obvious explanation of this observation is that amplification introduced by the process generally increases both the level of signal and that of the error, by the same factor. Of course, the converse is also true for process attenuation. Notable exceptions are the over and under NMO correction tests, both associated with the stack process.

Figure 5:
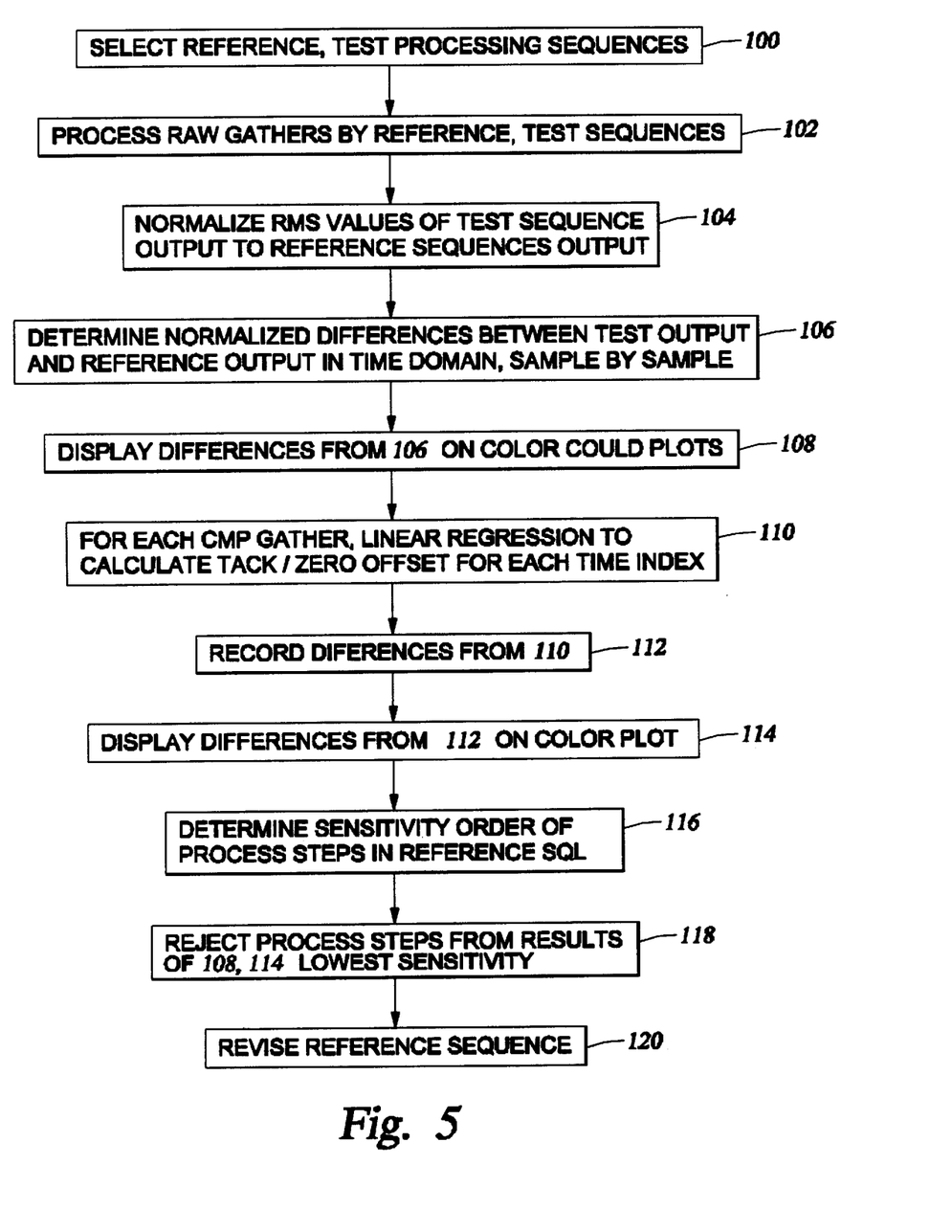
FIG. 5 is a flow chart showing the process of "Seismic Sensitivity Testing" according to the invention.

Residual NMO produces the horizontal in-phase components contribution from primary reflections and has a lesser effect on the error level. This can be seen by comparing FIGS. 1 and 2 over the time interval from 500 ms to 700 ms. A higher relative error level (FIG. 2) corresponds to energy attenuation (FIG. 1). The opposite can be observed for the U-NMO. The process of seismic sensitivity testing is shown in the flow chart of FIG. 5. Selection of the reference and test processing sequences is shown at 100. Processing raw gathers by both the test and reference sequences is shown at 102. At 104, RMS values of the output of the test and reference sequences are normalized. Differences between the normalized RMS values in the test and reference sequences are then calculated in the time domain for each sample (time index), as shown at 106. These differences are then displayed on color plots as shown at 108. For each CMP gather, a linear regression is performed to calculate the stack and the zero offset values for each time index, as shown at 110. The differences between the zero offset and stack at each time index thus calculated are then recorded, as shown at 112. These differences are then also displayed on color plots as shown at 114. The sensitivities of each of the process steps in the reference sequence can then be ordered from the color plots as shown at 116. The lowest sensitivity process steps can then be rejected, as shown at 118, and a new reference sequence can then be developed, as shown at 120.

IPD—Integrated Parameter Determination

IPD is a multi-well, multi-trace interactive software system which enables optimum selection of seismic processing parameters in the order determined by SST. This task is carried out by quantitative and objective evaluation of the results obtained from the integration of borehole and seismic data. Since borehole data provides an accurate measure of the vertical subsurface acoustic response and stratigraphy, the objectives set out above can be fully met at all well locations by measuring the quality of match between the well data and seismic data.

Migrated stack panels of seismic traces around a well location are generated for many combinations and permutations of the seismic processing parameters to be tested. Attribute values are calculated from the wavelets extracted from each trace in each stack panel using well acoustic data and are displayed as a color plot matrix called SCAN. These attribute values define both the best correlation between the well trace and the corresponding seismic trace and the complexity of the extracted wavelet.

Wavelets are extracted from the seismic traces and well reflectivity by least squares estimation. This extraction method utilizes a technique which prevents bias in the estimation procedure due to trace truncation end-effects.

One of the attributes displayed by the SCANs is called GF. It is a measure of the goodness of fit of the well trace to the seismic data. The well trace is generated by convolving the well reflectivity with the extracted wavelet from each trace. In order to obtain statistically significant values for GF and to avoid noise and multiples being included in the extracted wavelet, the wavelet length to the extraction window length ratio (WWLR) must be kept sufficiently small. There is no universal rule to calculate the WWLR; in practice we do not let this ratio exceed 0.25.

The other measured attribute is called WF and is a measure of the complexity of the extracted wavelets. The WF of an extracted wavelet, relative to a reference wavelet having the same bandwidth as the data, is a sensitive measure of the wavelet energy distribution away from the extracted wavelet origin, and its value can vary between zero and one (0–100% on the SCANs). The WF for a given extracted wavelet approaches 100%, if the amplitude decreases rapidly away from the main peak and its shape approaches that of the reference wavelet. If on the other hand the wavelet shows pronounced pre-and post-cursive activity, the WF can drop to values less than 10%. Multiples and noise tend to increase the energy of the extracted wavelet away from its origin, thereby decreasing the WF. In practice, typical WF maximum values can range between 40% to 80% depending on noise and multiple content. The length of the extracted wavelets required for this type of SCAN is usually very long to enable the inclusion of noise and multiple energy in the extracted wavelet.

The layout of each SCAN is designed to provide at a glance all the pertinent information required for the evaluation and selection of processing steps or parameters.

Figure 3:
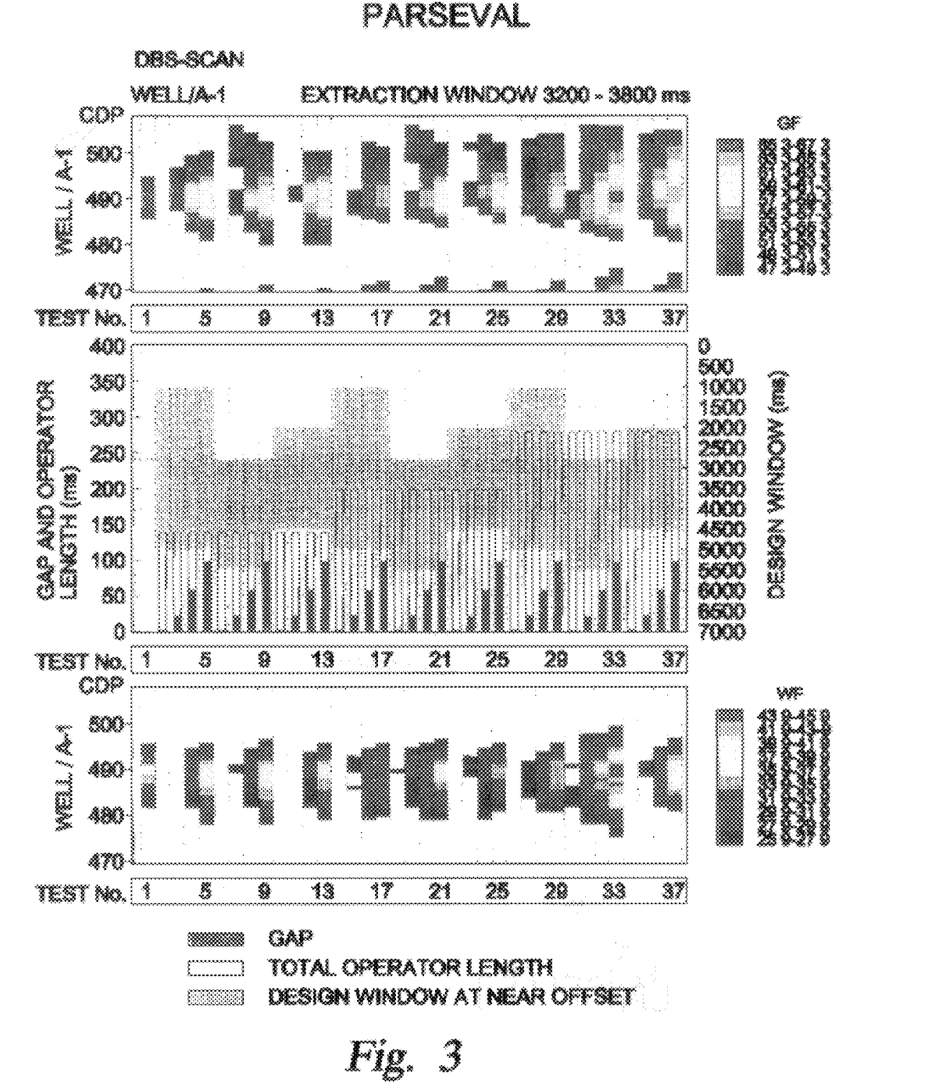
FIG. 3 is an example display of a SCAN with GF and WF.

The SCAN color display in FIG. 3 is an example which illustrates the details of the SCAN's layout. This SCAN is a DBS-SCAN. Sixty-one different stack panels of 200 traces each were generated using many combinations and permutations of DBS gaps, operators and window lengths. The layout of the SCAN consists of an upper, a lower and a center window. The upper and lower windows show the color matrix values of GF and WF respectively. Colors are keyed to WF and GF values according to the key on the right. The color keys are automatically normalized to the highest attribute (GF or WF) value obtained for the SCAN. The axis for the GF and WF color matrices are CDP numbered on the left. The geographical well location is also indicated on the same side. The center window is a graphical representation of the DBS parameters such as gap length (solid red bars) and prediction operator length (red line bars) referenced to the scale on the left (red) and the design window (solid blue bars) referenced to the scale on the right (blue). The purpose of the "Test number" strips displayed under each color matrix and the center parameter box, is to relate each combination of parameters to the GF and WF values.

Optimum deconvolution parameters can be obtained at a glance from FIG. 3. The maximum GF and WF values (red) occur at test number 33. The DsS parameters for this test can be obtained directly from the parameters window as: gap 100 ms, operator length 280 ms, design window 2800–550 ms.

Figure 4:
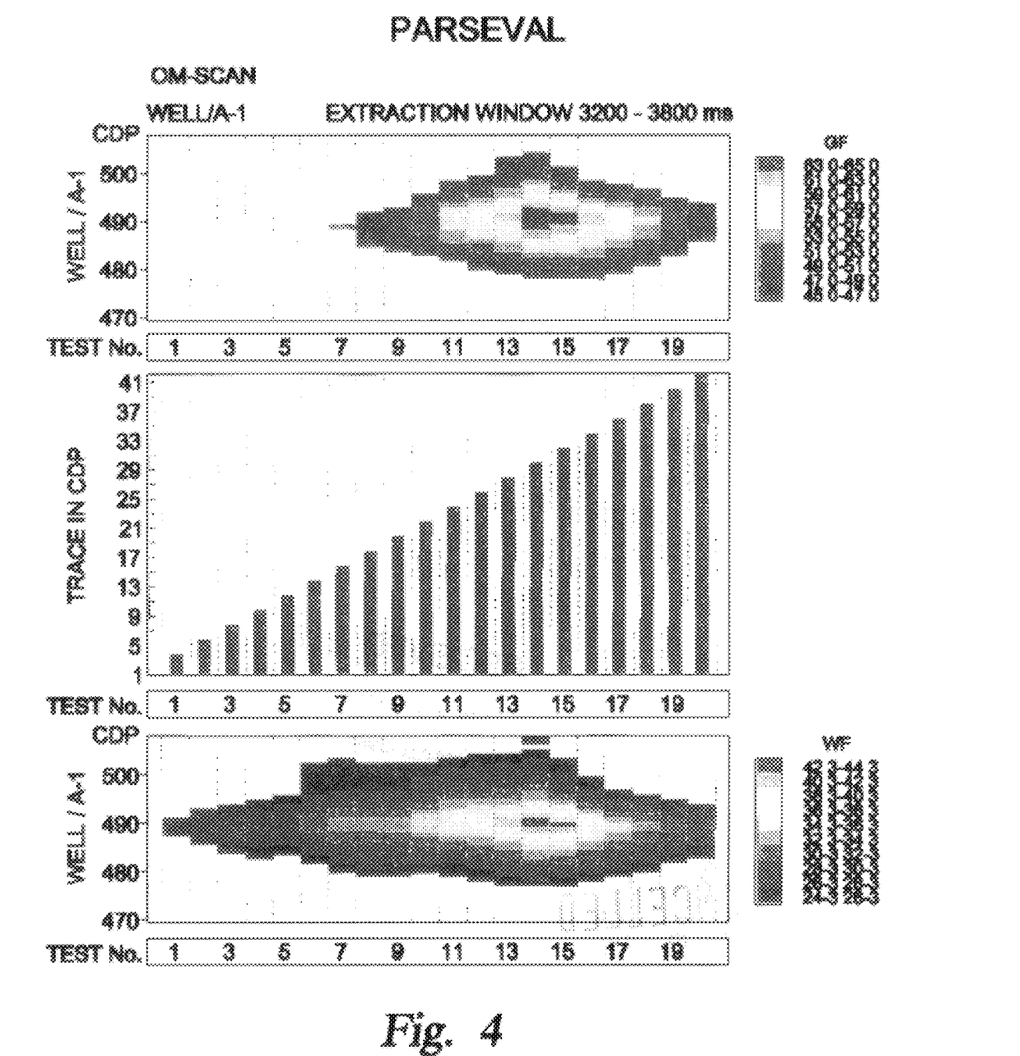
FIG. 4 is an example display of another SCAN with GF and WF.
Figure 6:
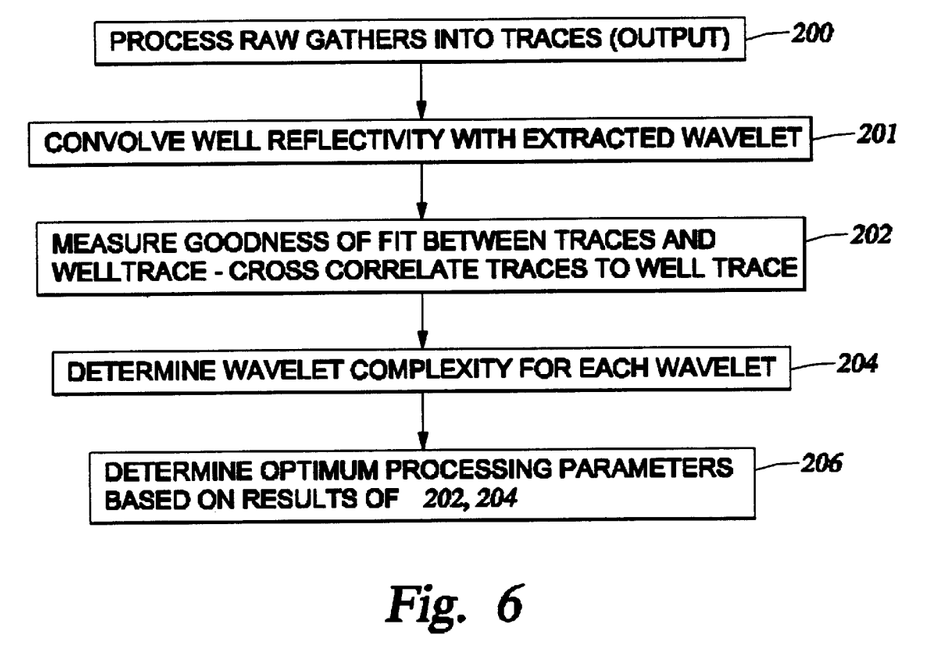
FIG. 6 is a flow chart showing the process of "Integrated Parameter Determination" according to the invention.

The SCAN methodology described above has also been adapted to optimise prestack data for QC and pre-AVO data conditioning. Finally, it should be pointed out that IPD is based on a single well or multi-well approach. Another example of a SCAN to determine the optimum number of traces (outer mute) to be included in the CMP stack is shown in FIG. 4. Tests number 14 and 15 show a maximum value for both GF and WF. Hence the optimum stack fold is around 30. The process of selecting the optimum process parameters is shown in a flow chart in FIG. 6. Processing the raw gathers into output traces is shown at 200. Well traces are shown at 201 as a convolution of the well reflectivity with the extracted wavelet. The goodness of fit (GF) calculation for each trace is shown at 202 as cross-correlation between the well trace and the output traces. The step of determining the wavelet complexity (WF) is shown at 204. Finally, the selection of the optimum parameters based on GF and WF is shown at 206.

Similar SCANs are employed to optimally select parameters for each processing step included in the processing sequence.

This invention has been described with a certain degree of specificity by way of example but not by way of limitation. Those skilled in the art will devise obvious variations to the examples given herein but which will fall within the scope and spirit of this invention.

I claim:

1. A method of determining an optimum processing sequence by calculation of processing sequence sensitivity and processing sequence error, comprising:
   a. providing a reference processing sequence to be applied to input raw gathers;
   b. selecting a series of test processing sequences to be applied to the input raw gathers;
   c. applying a reference processing sequence and a test processing sequence to the input raw gather to obtain a reference and test seismic output data;
   d. normalizing an RMS value of the test seismic output data to that of the reference seismic output data on a trace by trace basis;
   e. finding a normalized difference between the test and the reference seismic output data on a sample by sample basis in the time domain;
   f. displaying the differences on color coded plots in time scale format over a CDP range;
   g. for each of a plurality of CMP gathers, performing linear regression to obtain a stack and a zero offset calculated for each time index;
   h. recording a difference between these two values obtained in g;
   i. finding normalized differences between the error for the test and the reference;
   j. displaying the results from i. on color coded plots for assessment;
   k. determining order of sensitivity for each processing step in the reference processing sequence; and
   l. rejecting any processing step based on the results from f and j and revising the reference processing sequence.

2. A method of optimizing processing parameters for processing steps in an optimized processing sequence by integration of acoustic borehole data with seismic data, the method comprising the following steps:
   a. taking input raw gather and generating traces therefrom;
   b. for each said trace, measuring goodness of fit (GF) by calculating a cross-correlation between each said trace and a well trace, the well trace being generated by convolving well reflectivity with an extracted wavelet;
   c. for each wavelet, measuring wavelet complexity (WF) by calculating a ratio of second moment ratio of the extracted wavelet to a second moment ratio of the reference wavelet; and
   d. determining the optimum processing parameters for each said processing step based on said goodness of fit and wavelet complexity.

3. The method as defined in claim 2 wherein said optimized processing sequence is determined by calculation of processing sequence sensitivity and processing sequence error, comprising:
   a. providing a reference processing sequence to be applied to input raw gathers;
   b. selecting a series of test processing sequences to be applied to the input raw gathers;
   c. applying a reference processing sequence and a test processing sequence to the input raw gather to obtain a reference and test seismic output data;
   d. normalizing an RMS value of the test seismic output data to that of the reference seismic output data on a trace by trace basis;
   e. finding a normalized difference between the test and the reference seismic output data on a sample by sample basis in the time domain;
   f. displaying the differences on color coded plots in time scale format over a CDP range;
   g. for each of a plurality of CMP gathers, performing linear regression to obtain a stack and a zero offset calculated for each time index;
   h. recording a difference between these two values obtained in g.;
   i. finding the normalized differences between the error for the test and the reference;
   j. displaying the results from i. on color coded plots for assessment;
   k. determining order of sensitivity for each processing step in the reference processing sequence; and
   l. rejecting any processing step based on the results from f and j and revising the reference processing sequence.

* * * * *